United States Patent [19]

Deutsch

[11] Patent Number: 4,974,401
[45] Date of Patent: Dec. 4, 1990

[54] COTTON HARVESTER

[75] Inventor: Timothy A. Deutsch, Newton, Iowa

[73] Assignee: Deere & Company, Moline, Ill.

[21] Appl. No.: 416,739

[22] Filed: Oct. 3, 1989

[51] Int. Cl.$^5$ ............................................. A01D 46/08
[52] U.S. Cl. ........................................... 56/28; 56/30; 56/40
[58] Field of Search .................. 56/48, 28, 40, 41, 29, 56/30, 31, 32, 33, 34, 35, 36, 37, 38, 39, 42, 43, 44, 45, 46, 47, 49, 50; 301/36 R, 13 R, 405

[56] References Cited

U.S. PATENT DOCUMENTS

| 3,401,510 | 9/1968 | Hubbard | 56/30 |
| 3,847,441 | 11/1974 | Morkoski et al. | 301/36 R |
| 4,059,942 | 11/1977 | Trimble et al. | 56/30 |
| 4,255,919 | 3/1981 | Copley et al. | 56/30 |
| 4,344,271 | 8/1982 | Schlueter et al. | 56/13.6 |
| 4,662,160 | 5/1987 | Hubbard et al. | 56/16.6 |
| 4,803,830 | 2/1989 | Junge et al. | 56/28 |
| 4,821,497 | 4/1989 | Deutsch et al. | 56/41 |
| 4,822,108 | 4/1989 | Benhart | 301/36 R |

Primary Examiner—Ramon S. Britts
Assistant Examiner—Terry Lee Melius

[57] ABSTRACT

A six row spindle type cotton picker includes a single drive wheel centrally located behind the two outer tandem drum row units at the right of the machine. An inner left drive wheel is located between the fourth and fifth row units just outwardly of the left side of the cab. The third or outer left drive wheel, connected by a spacer to the inner drive wheel, is located behind the fifth and sixth row units. The arrangement of the three wheels provides good weight distribution so that no one wheel is overloaded by the added weight of the sixth row unit. The relatively narrow tandem drum units and the wheel mounting arrangement facilitate unit positioning for harvesting narrow row cotton while assuring adequate support for the extra weight of the additional unit or units, and the third drive wheel is mounted to and spaced from the inner left wheel so that all wheels run between harvested rows to maximize tire wear and machine handling and minimize crop damage. A basket arrangement, which is centrally located behind the cab for good weight distribution on the drive wheels, is equipped with a linkage-actuated extension to facilitate dumping with the widened harvesting area. The arrangement of the three drive wheels provides added stability during dumping.

17 Claims, 3 Drawing Sheets

COTTON HARVESTER

BACKGROUND OF THE INVENTION

1. Field of the Invention

The present invention relates generally to cotton harvesters, and more specifically to cotton pickers which can pick up to six consecutive rows of cotton plants in one pass.

2. Related Art

Spindle types of cotton harvesters, such as the John Deere Model 9940 Cotton Picker, have been available for picking four rows of cotton at a time. More recently, harvesters such as the John Deere Model 9960 Cotton Picker have been introduced for picking up to five consecutive rows of narrowly spaced cotton. Such a harvester and the row unit support structure for the harvester are described generally in U.S. Pat. Nos. 4,821,497 and 4,803,830. The increasing popularity of narrow row cotton and the continuing desire on the part of farmers to increase the productivity of their machines have been factors which have highlighted the need for a cotton picker having more than four or five row capacity. However, certain characteristics of the spindle type harvester have hindered such a development. Each of the row units on a picker is relatively heavy and includes a large number of moving components which put a substantial mass in motion, and supporting more than four units at the front of the harvester frame is difficult. The widened harvesting area hinders close positioning of the basket to the module builder or other cotton-receiving container during dumping. In addition, each row unit requires one or more cotton conveying ducts which extend upwardly and rearwardly to the cotton basket, and not only must the ducts be carefully routed around the harvester cab, frame and various other machine components, they must also be located such that servicing of the units can be facilitated. Heretofore these and other problems have hindered the development of a picker having more than a four row capacity.

BRIEF SUMMARY OF THE INVENTION

1. Objects of the Invention

It is therefore an object of the present invention to provide an improved cotton harvester of the spindle type. It is a further object to provide such a harvester which has the capacity to harvest five or six rows of cotton in a single pass and which is easy to maneuver through the field.

It is another object of the present invention to provide an improved cotton picker for simultaneously harvesting five or six rows of cotton. It is yet a further object to provide such a picker which can harvest six consecutive narrowly spaced rows of cotton. It is still another object to provide such a picker which has good unloading characteristics such as stability and basket dump reach despite a widened harvesting area.

It is still another object of the invention to provide an improved multi-row cotton picker which has increased capacity for supporting the weight of extra row units. It is another object to provide such a picker which supports five or more row units while facilitating access to the row units. It is yet a further object to provide such a structure which is relatively easy to maneuver in the field and which has an advantageous duct and operator platform arrangement.

2. Features and Advantages of the Invention

A cotton harvester constructed in accordance with the teachings of the present invention includes five or six tandem drum row units supported in two groups by two independent lift frames with each group individually height sensed. A single cotton-conveying duct extends rearwardly and upwardly from each row unit.

The left lift frame is extended to accommodate the sixth unit outwardly of the normal operator entry location on the harvester. The operator platform is also extended to the left, and the two left-most cotton conveying ducts are passed through the platform at one side of the cab. The two centrally located ducts extend upwardly behind the cab, and the two right-most ducts are offset to the right of the cab.

A single drive wheel is centrally located behind the two outer row units at the right of the machine. An inner left drive wheel is centrally located between the fourth and fifth row units just outwardly of the left side of the cab. A third or outer left drive wheel, connected by a spacer to the inner drive wheel, is centrally located behind the fifth and sixth row units. Each of the drive wheels is centrally located with respect to fore-and-aft extending upright planes which pass through the corresponding row-receiving areas on the adjacent units. The arrangement of the three wheels provides good weight distribution so that no one wheel is overloaded by the added weight of the sixth row unit. The combination of the relatively narrow tandem drum units and wheel mounting arrangement facilitate spacing of the units for harvesting narrow row cotton while assuring adequate support for the extra weight of the additional unit or units, and the additional drive wheel is conveniently mounted to and spaced from the inner left wheel for driving the harvester with all wheels positioned between harvested rows to maximize tire wear and machine handling ease while minimizing crop damage.

To improve dumping characteristics with the widened harvesting area, an extension is connected to the basket. A linkage automatically moves the extension outwardly during unloading. Therefore, a conventional basket arrangement which is centrally located behind the cab can be utilized without sacrificing the ability to dump conveniently. Better weight distribution on the multiple wheel arrangement is provided than with an arrangement wherein the center of gravity of the basket is moved outwardly toward the sixth unit side of the harvester. Placement of the additional drive wheel on the dump side of the harvester adds stability during dumping.

These and other objects, features and advantages of the present invention will become apparent to one skilled in the art from the detailed description below when read in view of the drawings.

DETAILED DESCRIPTION OF THE DRAWINGS

Figure 1:
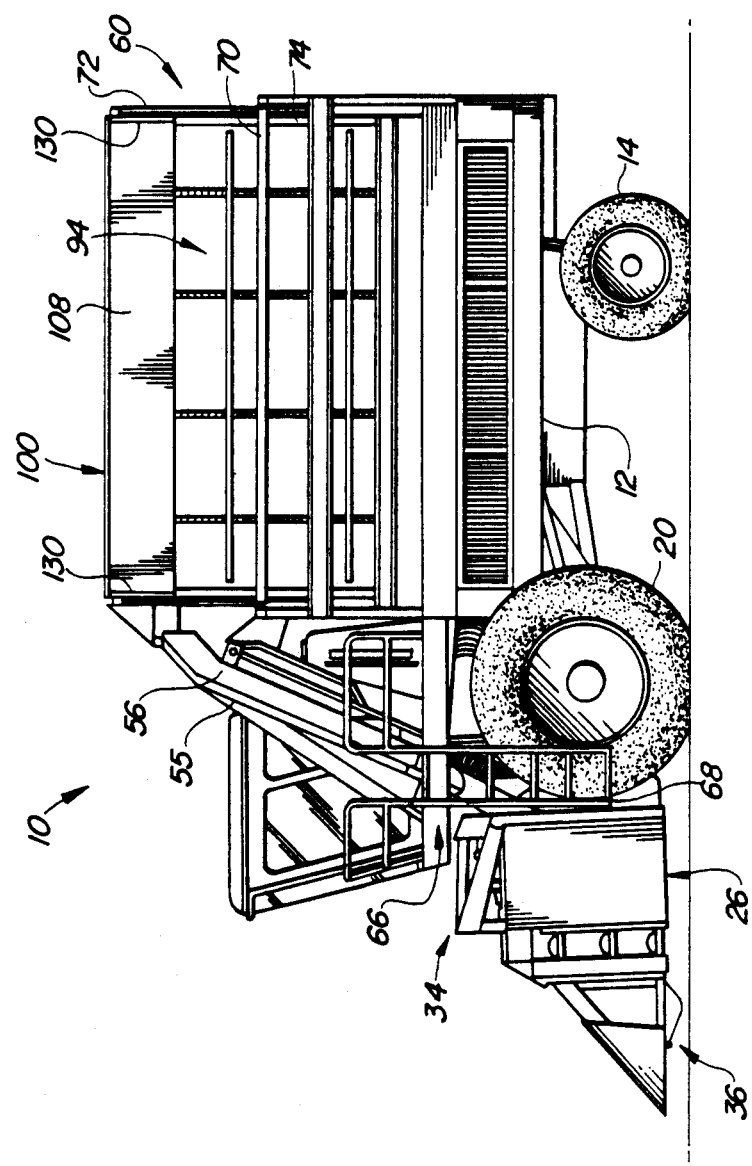
FIG. 1 is a side view of a six row cotton picker constructed in accordance with the teachings of the present invention.
Figure 2:
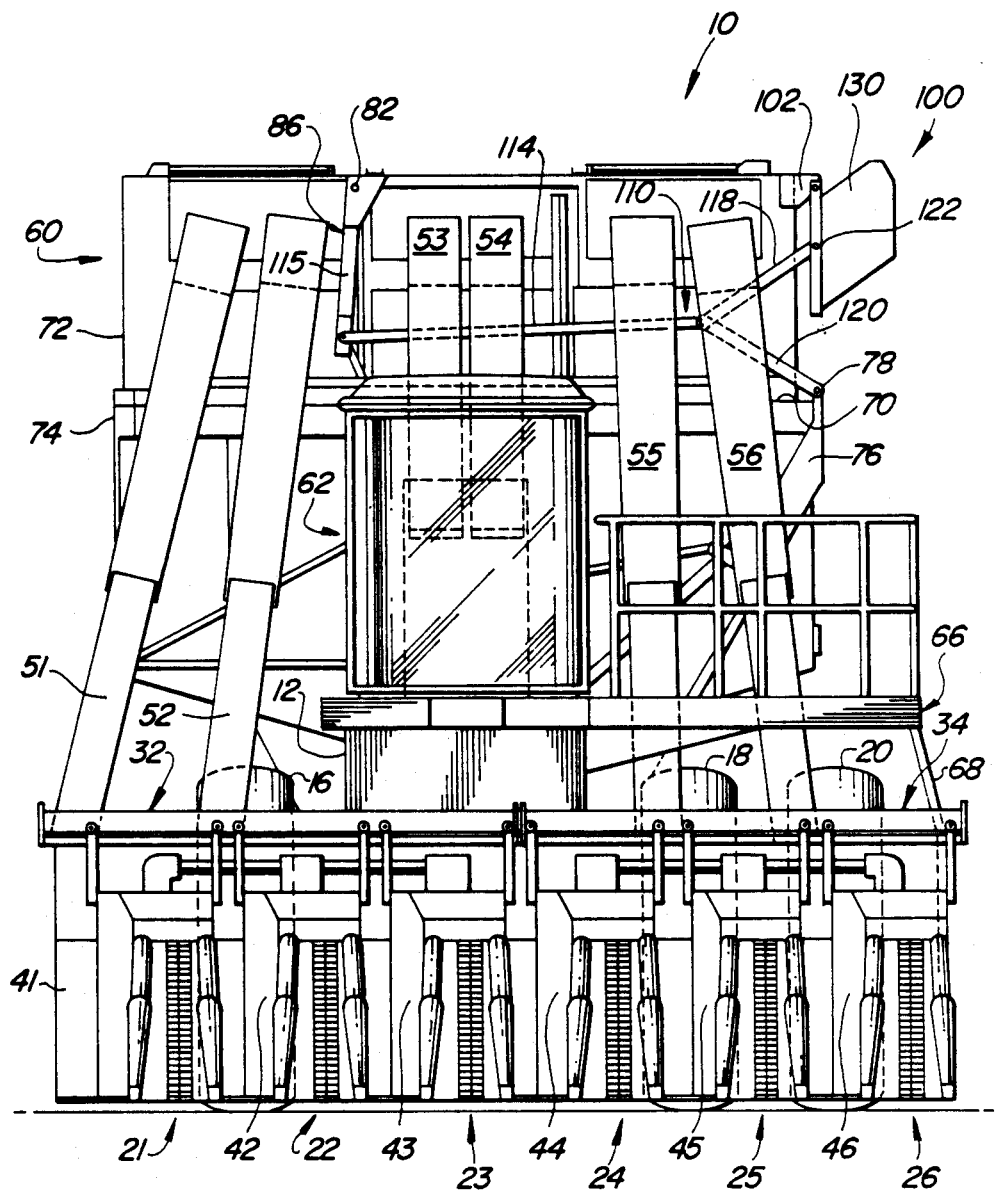
FIG. 2 is a front view of the picker of FIG. 1.
Figure 3:
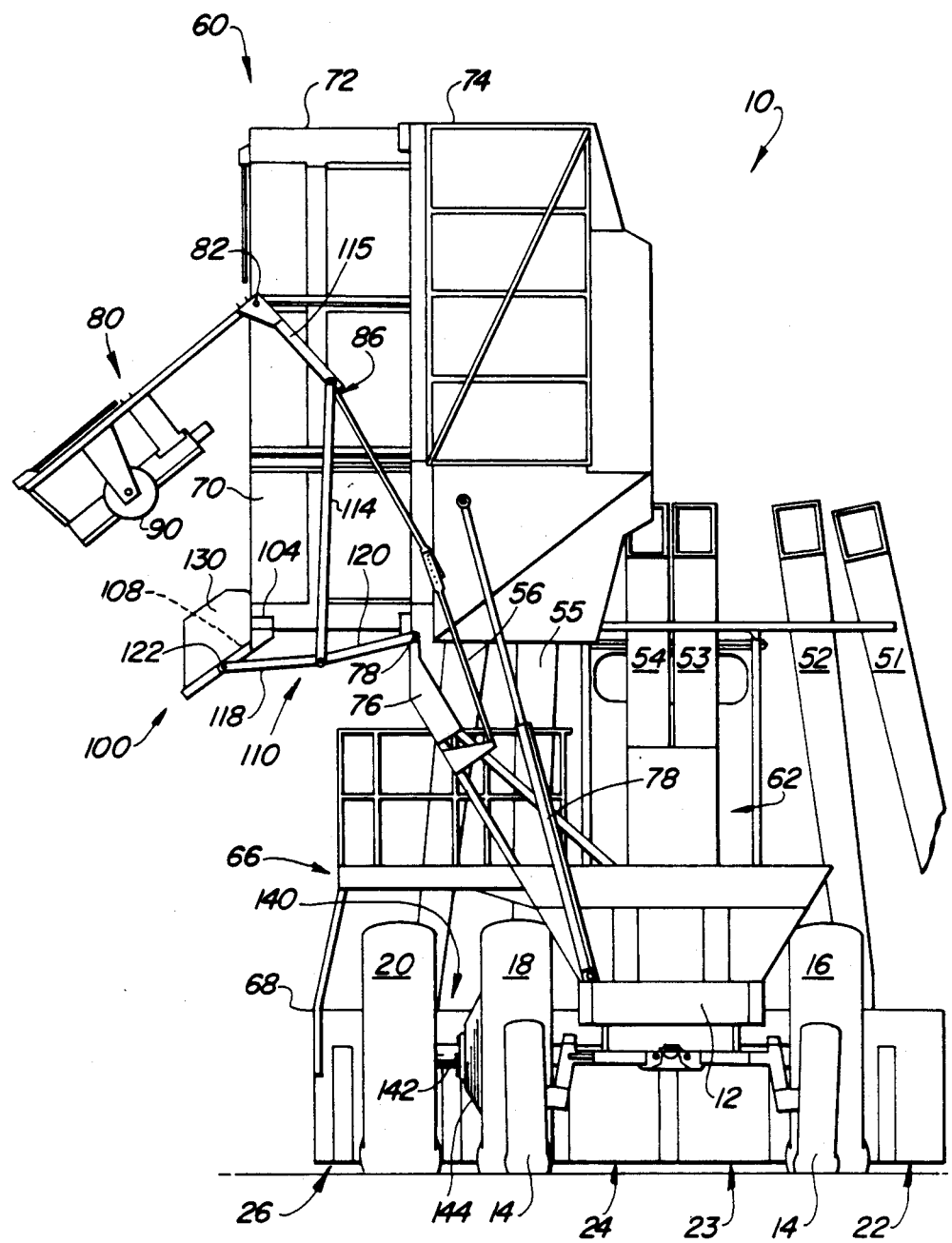
FIG. 3 is a rear view of the picker of FIG. 1 showing the basket in the dump position with the basket dump extension rotated outwardly.

Referring now to FIGS. 1-3, therein is shown a cotton harvester 10 having a main frame 12 supported by rear steerable wheels 14 and front drive wheels 16, 18 and 20 for forward movement over a field of cotton plants. A plurality of transversely spaced tandem drum row units 21-26 of the type shown and described in the aforementioned U.S. Pat. No. 4,821,497 are supported from the forward end of the frame 12 by right- and left-hand (as viewed in the forward direction of travel) row unit support assemblies 32 and 34, respectively. The support arrangement is generally of the type shown and described in U.S. Pat. No. 4,803,830, but the left-hand support assembly 32 is extended outwardly in the direction of the dump side of the basket, as will be described in detail below. Each of the assemblies 32 and 34 is separately height-sensed and controlled by height sensing structure 36 (FIG. 1) to maintain the row units supported thereon at the proper operating level. For a more detailed description of the height sensing arrangement, reference may be had to U.S. Pat. No. 4,809,487.

Each of the row units 21-26 includes corresponding cotton-receiving door structure 41-46 outwardly adjacent the pair of tandem drums (not shown) located at one side only of the row receiving area with the axis of the tandem drums for a given unit lying generally in a fore-and-aft extending upright plane. Cotton harvested by the row units 21-26 is directed outwardly and rearwardly into the door structure 41-46, and from the door structure it is propelled upwardly through individual cotton conveying ducts 51-56 to basket structure 60.

A cab 62 is supported by the frame 12 above and generally centrally located with respect to first and second drive wheels 16 and 18. As best seen in FIG. 1, the cab aligned with the third row unit (row unit 23) from the right-hand side of the harvester. The third and fourth cotton conveying ducts 53 and 54 which service the units 23 and 24, respectively, extend through the back side of the cab 62.

An operator platform 66 extends outwardly toward the dump side (the left side) of the harvester over the wheels 18 and 20, and a ladder 68 is connected to the platform outwardly of the wheel 20. The ducts 55 and 56 which service the two dump side row units 25 and 26, respectively, extend upwardly through the platform 66 above the wheels 18 and 20. The ducts 51 and 52 which service the two right-most units 21 and 22, respectively, extend upwardly at the right side of the cab 62. The left side of the unit support structure 34 is extended to accommodate the unit 26.

The wheel 16 is centered between the row-receiving areas for the units 21 and 22 to run between the two right-most rows of cotton being harvested. The inner drive wheel 18 is centered between the row-receiving areas of the fourth and fifth units 24 and 25 below the platform 66. The third drive wheel 20 is centered between the row-receiving areas of the fifth and sixth row units 25 and 26 and is located outwardly of the dump side of the basket structure 60. The drum axis plane of the row unit 26 intersects the outermost portion of the third drive wheel 20. As best seen in FIG. 1, the opposite right the basket structure 60 is generally aligned with the right-most unit 21. Therefore, the basket structure 60 and the cab 62 are substantially centered with respect to the first and second drive wheels 16 and 18 and the first five row units 21-25. The outermost or third drive wheel 20 provides the necessary additional support for the sixth row unit 26 and additional stability for the harvester when the center of gravity is shifted in the direction of the wheel 20 during dumping (FIG. 3).

The basket structure 60 is generally of the type utilized with the commercially available John Deere Model 9960 Cotton Picker, and includes a basket 70 with an upper basket portion 72 telescopingly received within a lower basket portion 74 for movement vertically between a retracted storage position and an extended field-working position. The basket structure 60 includes masts 76 pivotally supporting the basket 70 for rocking about a fore-and-aft extending axis by dump cylinders 78 between a field-working position (FIG. 1) and a dump position (FIG. 3). Basket lid structure 80 is pivotally connected at 82 to the upper basket portion 72 for rocking outwardly by linkage structure 86 connected between the mast 76 and the lid structure. As the cylinders 78 are extended and the basket 70 rocks toward the dump position of FIG. 3, the linkage 86 rotates the lid structure in the clockwise direction about the pivotal axis of the connection 82. Retracting the cylinder 78 rotates the basket 70 downwardly and at the same time the linkage 86 rocks the lid structure 80 to the closed position. An auger 90 located on the pivoting lid structure 90 serves to compact cotton during harvesting and to help meter cotton uniformly from the basket 70 during dumping.

The basket structure also includes a dump conveyor 94 which is supported at the dump side of the basket 70 (FIG. 1) and defines the lowermost part of the basket in the dump position of FIG. 3. The conveyor is supported from the upper part of the basket portion 72 and projects vertically downwardly therefrom. When the basket portion 72 is telescoped into the portion 74 for transport and storage, the conveyor 94 moves with the portion 72. Further details of the telescoping basket may be had by reference to copending application Ser. No. 07/255,937, entitled TELESCOPING BASKET FOR A COTTON HARVESTER, filed 11 Oct. 1988 and of common ownership with the present application.

The added width of the harvester resulting from addition of the fifth and sixth row units 25 and 26 at the dump side tends to hinder close-in positioning of the basket structure 60 relative to the dump location. To increase the lateral throw of the cotton from the basket 70 and prevent spilling cotton beyond the intended barriers of the dump site, basket extension structure indicated generally at 100 is pivotally connected to the upper basket portion 72 by forward and aft pivot brackets 102 and 104, respectively, for rocking between a retracted position (FIG. 1) corresponding to the field-working position of the basket 70, and an extended position (FIG. 3) corresponding to the dump position of the basket 70. The extension structure includes a panel 108 extending in the fore-and-aft direction between the basket end walls. Linkage structure 110 connected between the basket linkage structure 86 and the ends of the panel 108 pivot the panel automatically as the basket 70 rocks between positions. The linkage structure 110 includes a first elongated link 114 pivotally connected at one end to a downwardly extending arm 115 fixed to the lid structure 80. Upper and lower links 118 and 120 are pivotally connected to the opposite end of the link 114. The lower link 120 has a distal end connected for rocking about the basket pivotal axis 78, and the upper link 118 has a distal end pivotally connected at 122 to the end of the panel 108. As the basket 70 rocks toward the dump position of FIG. 3, the arm 115 pushes the pivotal connection of the links 114, 118 and 120 outwardly from the position shown in FIG. 1 and thereby rocks the panel 108 outwardly about the pivotal connections with the brackets 102 and 104. In the dump position of FIG. 3, the panel 108 extends outwardly and downwardly from the dump side edge of the upper basket portion 72 to direct cotton outwardly from the conveyor 94. Side panels 130 project generally perpendicularly from the ends of the panel 108 to prevent spilling at the forward and rearward boundaries of the dump area. As the basket 70 is pivoted to the field-working position, the arm 115 pulls the link 114 to scissors the links 118 and 120 (FIG. 2) and rock the panel to a compact upright storage position alongside the conveyor 94 (FIG. 1).

The auger 90 is rotated above the extension structure 100 during dumping to help meter the cotton uniformly over the extension. As best seen in FIGS. 1 and 3, the basket pivot axis 78 is located inwardly of the outermost side of the third drive wheel 20 and a substantial portion of the basket 30 extends inwardly from the third wheel 20 (FIG. 3) to provide good stability during dumping.

The outer drive wheel 20 is connected by wheel bracket structure 140 (FIG. 3) which includes an axle extension 142 bolted to an inwardly concave center wheel portion 144 of the wheel 18. A final drive assembly (not shown) projects into the concave portion 144 to reduce the distance between the outer wheel 20 and the end of the final drive assembly to reduce loading on the final drive assembly. To provide good crop clearance between the wheels 18 and 20, the diameter of the extension 142 is kept relatively small and the central portion of the wheel 20 is maintained between the planes of the sides of the wheel 20. The wheels 16, 18 and 20 are transversely spaced to run in the area between rows of cotton plants.

Having described the preferred embodiment, it will become apparent that various modifications can be made without departing from the scope of the invention as defined in the accompanying claims.

I claim:

1. A cotton harvester for harvesting a plurality of consecutive rows of cotton planted in parallel rows in a field, the harvester comprising a fore-and-aft extending main frame, a plurality of row units, each row unit including at least two upright picker drums defining a row-receiving area, a cab centrally located at the forward end of the frame, first and second drive wheels supported by the frame outwardly adjacent the cab, means for supporting a first and a second row unit from the forward end of the frame with the first drive wheel positioned rearwardly of and between the first and second unit row receiving areas, means for supporting third, fourth and fifth row units from the frame forwardly of the second drive wheel with the second drive wheel located between the row receiving areas of the third and fourth row units, and a third drive wheel located outwardly adjacent the second drive wheel rearwardly of and between the row receiving areas of the fourth and fifth row units, whereby the drive wheels run between rows of picked cotton while the harvester is operating in the field; and wherein the row units comprise tandem drum units having upright picking drums spaced on one side only of the corresponding row-receiving area, the axis of the tandem drums for a given unit lying generally in a fore-and-aft extending upright plane, and wherein the drum axis plane for the fifth row unit intersects the outermost portion of the third drive wheel.

2. The invention as set forth in claim 1 including a sixth row unit supported between the second and third row units.

3. The invention as set forth in claim 1 including a spacer member for supporting the third drive wheel from the second drive wheel.

4. The invention as set forth in claim 1 including a single cotton conveying duct extending upwardly from each of the row units to a cotton basket supported on the frame, a platform extending transversely from the cab in the direction of the fifth row unit, wherein the ducts for the fourth and fifth row units extend upwardly through the platform, and the ducts for the first and second units are located outwardly of the side of the cab opposite the platform side of the cab.

5. The invention as set forth in claim 4 wherein the basket is generally centered behind the cab, means for moving the basket to a dump position toward the fifth row unit side of the harvester wherein cotton from the basket is expelled toward the side so that the third drive wheel stabilizes the harvester during dumping.

6. A cotton harvester for harvesting a plurality of consecutive rows of cotton planted in parallel rows in a field, the harvester comprising a fore-and-aft extending main frame, a plurality of row units, each row unit including at least two upright picker drums defining a row-receiving area, a cab centrally located at the forward end of the frame, first and second drive wheels supported by the frame outwardly adjacent the cab, means for supporting a first and a second row unit from the forward end of the frame with the first drive wheel positioned rearwardly of and between the first and second unit row receiving areas, means for supporting third, fourth and fifth row units from the frame forwardly of the second drive wheel with the second drive wheel located between the row receiving areas of the third and fourth row units, and a third drive wheel located outwardly adjacent the second drive wheel rearwardly of and between the row receiving areas of the fourth and fifth row units, whereby the drive wheels run between rows of picked cotton while the harvester is operating in the field, a single cotton conveying duct extending upwardly from each of the row units to a cotton basket supported on the frame, a platform extending transversely from the cab in the direction of the fifth row unit, wherein the ducts for the fourth and fifth row units extend upwardly through the platform, and the ducts for the first and second units are located outwardly of the side of cab opposite the platform side of the cab, wherein the basket is generally centered behind the cab, means for moving the basket to a dump position toward the fifth row unit side of the harvester wherein cotton from the basket is expelled toward the side so that the third drive wheel stabilizes the harvester during dumping, and including a basket dump extension and means for moving the extension outwardly beyond the side of the harvester during dumping.

7. A cotton picker for harvesting six consecutive rows of cotton in one pass over a field of cotton plants, the picker comprising a fore-and-aft extending main frame; first and second transversely spaced drive wheels supporting the forward end of the frame for movement over the ground; a cab supported by the frame above and generally between the first and second drive wheels; a cotton basket located behind the cab and moveable between a harvesting position and a dump position; unit support structure connected to the forward end of the frame; six row units transversely spaced on the unit support structure, each row unit including a row-receiving area and two upright picker drums offset to one side of the row-receiving area and spaced fore-and-aft one behind the other for harvesting a single row of cotton from one side only of the row and a discharge door extending rearwardly from the forward drum on the side of the drums opposite the row-receiving area, a single cotton conveying duct extending upwardly toward the basket from the discharge door; a platform extending outwardly on one side of the cab to a location generally aligned with the outermost row unit on that one side, the platform including first and second openings for receiving the ducts for the two outermost row units on that one side; wherein the ducts on the two center row units extend rearwardly and upwardly through the cab, and the ducts for the two outermost row units on the side of the cab opposite the platform are located outwardly of the cab; and first, second and third axially aligned drive wheels located rearwardly adjacent the unit support structure, the first wheel supported generally in line with the discharge door on one of the two outermost row units on the side of the cab opposite the platform side, and the second and third wheels located below the platform in line with the discharge doors on two adjacent row units on the platform side so that the three wheels are positioned between rows of cotton, and wherein the third wheel is located between the two outermost row units under the platform.

8. The invention as set forth in claim 7 including a wheel bracket connecting the second and third wheels for rotation in unison on opposite sides of a single row of cotton.

9. The invention as set forth in claim 7 wherein the second wheel includes a central final drive-receiving portion concave inwardly and extending outwardly beyond the plane of the outer edge of the second wheel, and including an axle extension projecting outwardly from the central portion and supporting the third wheel for rotation with the second wheel, the axle projection being substantially smaller than the central portion to define therewith a plant passage area for reducing wheel contact with the cotton plants.

10. The invention as set forth in claim 7 wherein the basket is dumpable toward the third wheel side of the harvester.

11. The invention as set forth in claim 10 wherein the basket, when in the field position, is generally contained between vertical planes passing through the outermost portions of the first and fifth row units and, when in the dump position, has a substantial portion located inwardly of the third wheel.

12. A cotton picker for harvesting six consecutive rows of cotton in one pass over a field of cotton plants, the picker comprising a fore-and-aft extending main frame; first and second transversely spaced drive wheels supporting the forward end of the frame for movement over the ground; a cab supported by the frame above and generally between the first and second drive wheels; a cotton basket located behind the cab and moveable between a harvesting position and a dump position; unit support structure connected to the forward end of the frame; six row units transversely spaced on the unit support structure, each row unit including a row-receiving area and two upright picker drums offset to one side of the row-receiving area and spaced fore-and-aft one behind the other for harvesting a single row of cotton from one side only of the row and a discharge door extending rearwardly from the forward drum on the side of the drums opposite the row-receiving area, a single cotton conveying duct extending upwardly toward the basket from the discharge door; a platform extending outwardly on one side of the cab to a location generally aligned with the outermost row unit on that one side, the platform including first and second openings for receiving the ducts for the two outermost row units on that one side; wherein the ducts on the two center row units extend rearwardly and upwardly through the cab, and the ducts for the two outermost row units on the side of the cab opposite the platform are located outwardly of the cab; and first, second and third axially aligned drive wheels located rearwardly adjacent the unit support structure, the first wheel supported generally in line with the discharge door on one of the two outermost row units on the side of the cab opposite the platform side, and the second and third wheels located below the platform in line with the discharge doors on two adjacent row units on the platform side so that the three wheels are positioned between rows of cotton; wherein the basket is dumpable toward the third wheel side of the harvester and the basket, when in the field position, is generally contained between vertical planes passing through the outermost portions of the first and fifth row units and, when in the dump position, has a substantial portion located inwardly of the third wheel, and further including a basket dump extension, and means responsive to the movement of the basket toward the dump position for automatically moving the dump extension to an outwardly directed position.

13. A cotton harvester for harvesting a plurality of consecutive rows of cotton planted in parallel rows in a field, the harvester comprising a fore-and-aft extending main frame, a plurality of row units, each row unit including at least two upright picker drums defining a row-receiving area, a cab centrally located at the forward end of the frame, first and second drive wheels supported by the frame outwardly adjacent the cab, means for supporting a first and a second row unit from the forward end of the frame with the first drive wheel positioned rearwardly of and between the first and second unit row receiving areas, means for supporting third, fourth and fifth row units from the frame forwardly of the second drive wheel with the second drive wheel located between the row receiving areas of the third and fourth row units, and a third drive wheel located outwardly adjacent the second drive wheel rearwardly of and between the row receiving areas of the fourth and fifth row units, a cotton receptacle supported on the frame for movement between a harvesting position and a dump position, wherein the receptacle in the dump position discharges harvested cotton toward the fifth row unit side of the harvester, and means for extending the lateral throw of the cotton from the basket including a dump extension connected to the receptacle and movable between a storage position alongside the receptacle, and means responsive extending outwardly from the receptacle, and means responsive to the movement of the receptacle to the dump position for moving the extension to the dump position.

14. The invention as set forth in claim 13 wherein the extension comprises a fore-and-aft extending member rockably connected to the receptacle, and the means responsive to the movement of the receptacle comprises and a link connected between the receptacle and the fore-and-aft extending member.

15. The invention as set forth in claim 14 wherein the receptacle includes a movable discharge door structure, and means operably connecting the link to the discharge door structure for moving the fore-and-aft extending member in response to movement of the discharge door structure.

16. The invention as set forth in claim 15 wherein the basket is rockable about a fore-and-aft extending axis, the door structure comprises a basket lid, and a lid linkage for automatically moving the basket lid upon rocking of the basket toward the dump position, and wherein the link is connected to the lid linkage for movement with the basket lid.

17. The invention as set forth in claim 13 wherein the extension in the dump position projects outwardly a substantial distance beyond the fifth row unit.

* * * * *